(12) United States Patent  (10) Patent No.: US 8,473,278 B2
Futagi et al.  (45) Date of Patent: Jun. 25, 2013

(54) SYSTEMS AND METHODS FOR IDENTIFYING COLLOCATION ERRORS IN TEXT

(75) Inventors: Yoko Futagi, Lawrenceville, NJ (US); Paul Douglas Deane, Lawrenceville, NJ (US); Martin Sanford Chodorow, New York, NY (US)

(73) Assignee: Educational Testing Service, Princeton, NJ (US)

( * ) Notice: Subject to any disclaimer, the term of this patent is extended or adjusted under 35 U.S.C. 154(b) by 824 days.

(21) Appl. No.: 12/458,847

(22) Filed: Jul. 24, 2009

(65) Prior Publication Data

US 2010/0036654 A1  Feb. 11, 2010

Related U.S. Application Data

(60) Provisional application No. 61/083,375, filed on Jul. 24, 2008.

(51) Int. Cl.
 *G06F 17/27* (2006.01)
(52) U.S. Cl.
 USPC .................................. 704/9; 704/4; 704/257
(58) Field of Classification Search
 USPC ............ 704/1–10, 251, 257, 255, 270, 270.1; 715/235
 See application file for complete search history.

(56) References Cited

U.S. PATENT DOCUMENTS 5,200,893 A * 4/1993 Ozawa et al. ................ 715/235
5,940,624 A * 8/1999 Kadashevich et al. ............ 704/9
7,031,911 B2 4/2006 Zhou et al.
7,574,348 B2 * 8/2009 Hon et al. ........................ 704/9
7,580,827 B1 * 8/2009 Brants et al. ..................... 704/1
7,774,193 B2 * 8/2010 Gao et al. ......................... 704/4

OTHER PUBLICATIONS

J. Zhang, J. Gao, and M. Zhou "Extraction of Chinese compound words—an experimental study on a very large corpus", 2000.*
Shei, C.C., Pain, H.; An ESL Writer's Collocational Aid; Computer Assisted Language Learning; 2000; vol. 13; No. 2; p. 167-182.
Smadja, Frank; Retrieving Collocations from Text: Xtract, Associate for Computational Linguistics; 1993; vol. 19; No. 1; p. 143-177.
Chang, Yu-Chia, et al.; An Automatic Collocation Writing Assistant for Taiwanese EFL Learners: A Case of Corpus-based NLP Technology; Computer Assisted Language Learning; Jul. 2008; vol. 21; No. 3; p. 283-299.
Deane, P.; A Nonparametric Method for Extraction of Candidate Phrasal Terms; Proceedings of the 43rd Annual Meeting of the Association for Computational Linguistics; 2005; p. 605-613.

(Continued)

*Primary Examiner* — Huyen Vo
(74) *Attorney, Agent, or Firm* — Jones Day

(57) ABSTRACT

Systems and methods for detecting collocation errors in a text sample using a reference database from a corpus are provided. Collocation candidates are identified within the text sample based upon syntactic patterns in the text sample. Whether a given collocation candidate contains a collocation error is detected, the detecting including: determining a first association measure using the reference database for the given collocation candidate; determining whether the first association measure satisfies a predetermined condition and identifying the given collocation candidate as proper if the first association measure satisfies the predetermined condition; determining an additional association measure for a variation of the given collocation candidate using the reference database; and determining whether or not the collocation candidate contains an error based upon the additional association measure of the variation.

34 Claims, 10 Drawing Sheets

OTHER PUBLICATIONS

Futagi, Yoko, et al.; A Computational Approach to Detecting Collocation Errors in the Writing of Non-native Speakers of English; Computer Assisted Learning; Oct. 2008; vol. 21; No. 4; p. 353-367.

Wible, D., et al.; Bootstrapping in a Language Learning Environment; Journal of Computer Assisted Learning; 2003; vol. 19; No. 4; p. 90-102.

Al-Zahrani, Mohammad; Knowledge of English Lexical Collocations Among Male Saudi College Students Majoring in English at a Saudi University; Doctoral Dissertation, Indiana University of Pennsylvania, Pennsylvania; 1998.

Benson, M.; Collocations and General-Purpose Dictionaries; International Journal of Lexicography, 3(1); pp. 23-34; 1990.

Benson, Morton, Benson, Evelyn, Ilson, Robert; The BBI Dictionary of English Word Combinations; John Benjamins Publishing Company: Amsterdam & Philadelphia; 1997.

Burghardt, Linda; Foreign Applications Soar at Universities; New York Times, Late Edition (East Coast); Apr. 7, 2002.

Cowie, Anthony; Multiword Units in Newspaper Language; In Perspectives on the English Lexicon, S. Granger (Ed.); Cahiers de l'Institut de Linguistique de Louvain, Louvain; pp. 101-116; 1991.

Cowie, Anthony; Multi-Word Lexical Units and Communicative Language Teaching; In Vocabulary and Applied Linguistics, P. Arnaud & H. Bejoint (Eds.); Macmillan: London, UK; pp. 1-12; 1992.

Crystal, David; English as a Global Language, Second Edition; Cambridge University Press: Cambridge, UK; 2003.

Diaz-Negrillo, Ana, Fernandez-Dominguez, Jesus; Error Tagging Systems for Learner Corpora; Revista Espanola deLinguistica Aplicada, 19; pp. 83-102; 2006.

Howarth, Peter; The Phraseology of Learners' Academic Writing; Ch. 8, In Phraseology: Theory, Analysis, and Application, A. Cowie (Ed.); Clarendon Press: Oxford, UK; pp. 161-186; 1998.

Hsu, Jeng-yih; Lexical Collocations and Their Relation to the Online Writing of Taiwanese College English Majors and Non-English Majors; Electronic Journal of Foreign Language Teaching, 4(2); pp. 192-209; 2007.

Martynska, Malgorzata; Do English Language Learners Know Collocations?; Investigationes Linguisticae, 11; http://www.staff.amu.edu.pl/~inveling; 2004.

National Center for Educational Statistics; Public School Student, Staff, and Graduate Counts by State: School Year 2000-01; NCES 2002-348; 2002.

Ratnaparkhi, Adwait; Maximum Entropy Models for Natural Language Ambiguity Resolution; Doctoral Dissertation, University of Pennsylvania, Pennsylvania; 1998.

Sheehan, Kathleen, Kostin, Irene, Futagi, Yoko, Hemat, Ramin, Zuckerman, Daniel; Inside SourceFinder: Predicting the Acceptability Status of Candidate Reading-Comprehension Source Documents; Educational Testing Service Research Report RR-06-24; 2006.

Sinclair, John; Corpus, Concordance, Collocation; Oxford University Press: Oxford, UK; 1991.

Tetreault, Joel; Futagi, Yoko, Chodorow, Martin; Reliability of Human Annotation of Usage Errors in Learner Text; Oral presentation at the Annual Conference of the Computer Assisted Language Instruction Consortium, San Francisco, California; 2008.

Van Rooy, Bertus, Schafer, Lande; The Effect of Learner Errors on POS Tag Errors During Automatic POS Tagging; Southern African Linguistics and Applied Language Studies, 20; pp. 325-335; 2002.

Wray, Alison; Formulaic Sequences in Second Language Teaching; Applied Linguistics, 21(4); pp. 463-489; 2000.

Zhang, Xiaolin; English Collocations and Their Effect on the Writing of Native and Non-Native College Freshmen; Doctoral Dissertation, Indiana University of Pennsylvania, Pennsylvania; 1993.

Pantel, Patrick, Dekang, Lin; Word-for-Word Glossing with Contextually Similar Words; Proceedings of the 1st Annual Meeting of the North American Chapter of Association for Computational Linguistics, 4; pp. 78-85; 2000.

Seretan, Violeta, Nerima, Luka, Wehrli, Eric; Using the Web as a Corpus for the Syntactic Based Collocation Identification; Language Technology Laboratory; 2004.

\* cited by examiner

200

*Seven kinds of lexical collocations*

| Label | Syntactic Pattern(s) | Examples |
|---|---|---|
| L1 | Verb of creation + Noun Phrase or Prepositional Phrase | *come to an understanding, launch a missile* |
| L2 | Verb + Direct Object (our VERB-noun) | *reject an appeal* |
| L3 | Adjective + Noun, Noun + Noun (our ADJ-noun and NOUN-noun) | *strong tea, house arrest* |
| L4 | Subject + Verb | *bees sting* |
| L5 | Noun of Noun (our NOUN-of-noun) | *a swarm of bees* |
| L6 | Adverb + Adjective | *sound asleep* |
| L7 | Verb + Adverb (our verb-ADVERB and ADVERB-verb) | *argue strenuously* |
| L8 | Phrasal Verb | *grow up* |

Example phrase: *east side*
Word: *east*
Context: ___ *side*

Suppose that the set of contexts and their *local* frequency (frequency when *east* fills the blank) for *east* and *global* frequency (overall frequency of the context, regardless of which word fills the blank) is as follows (all numbers are fictional for the purpose of illustration):

| Context | Local frequency | Global frequency |
|---|---|---|
| ___ *end* | 38 | 470 |
| ___ *side* | 46 | 910 |
| *the* ___ | 98 | 12,000 |
| *toward the* ___ | 24 | 1,300 |

The *actual rank* of ___ *end* is calculated by sorting all the contexts by their local frequency:

| Context | Local frequency | Actual rank |
|---|---|---|
| *the* ___ | 98 | 1 |
| ___ *side* | 46 | 2 |
| ___ *end* | 38 | 3 |
| *toward the* ___ | 24 | 4 |

The *expected rank* of ___ *end* is calculated by sorting all the contexts by their global frequency:

| Context | Global frequency | Expected rank |
|---|---|---|
| *the* ___ | 12,000 | 1 |
| *toward the* ___ | 1,300 | 2 |
| ___ *side* | 910 | 3 |
| ___ *end* | 470 | 4 |

The rank ratio of *east* in ___ *side* is the ratio between the expected rank (here, 3) and the actual rank (here, 2), that is, 1.5.

FIG. 3

SYSTEMS AND METHODS FOR IDENTIFYING COLLOCATION ERRORS IN TEXT

RELATED APPLICATIONS

This application claims the benefit of U.S. Provisional Patent Application No. 61/083,375 filed Jul. 24, 2008, the entire contents of which are incorporated herein by reference.

FIELD

The technology described in this patent document relates generally to text analysis and more specifically to identifying collocation errors within a text.

BACKGROUND

Worldwide, there are an estimated 750 million people who use English as a second language, as compared to 375 million native English speakers. In addition, in United States alone, there are an estimated 4 to 5 million students with limited English proficiency in public schools, as well as a large number of international students in American colleges and universities. These numbers highlight a growing need for support for non-native speakers of English who must perform academically in English, though their English language proficiency is limited.

There are several different types of errors that non-native speakers make, some of which are usage errors. One such error is a collocation error. A collocations is a collection of words where the words of the collection occur close, although not necessarily adjacent, to one another, where the collection of words is arbitrary but has a conventional meaning, and where the collection of words occurs more frequently than by chance (e.g., "strong tea," "hold an election").

Various studies have found that knowledge of collocations is an important part of language learning. In tests of collocation abilities, native speakers usually outperform non-native speakers significantly. Collocational knowledge may be viewed as a source of fluency in written communication, and the quality of collocation in terms of variety and accuracy may be indicative of the quality of one's writing ability.

While the frequency of collocations in a text or speech can vary, the presence of an atypical combination of words, such as "powerful tea" instead of "strong tea," can disrupt communication. Since collocations are not rule-governed and vary from language to language, each one needs to be learned. Considering the great number of collocations that are in common use, teaching them to English language learners is a formidable task. Knowing which subset of grammatically possible utterances is actually commonly used by native speakers is an immense problem for even the most proficient of nonnative speakers. Dictionaries and thesauri, common aids for an English learner, are often of limited value when one does not know the appropriate collocation and must sort through a list of synonyms to find a contextually appropriate one.

SUMMARY

In accordance with the teachings provided herein, systems and methods are provided for detecting collocation errors in a text sample using a reference database from a text corpus. An exemplary system may include a processing system and a computer-readable memory coupled to the processing system. The processing system may be configured to identify collocation candidates within the text sample based upon syntactic patterns in the text sample using the processing system. The processing system may further be configured to detect whether a given collocation candidate contains a collocation error using the processing system. Detecting whether a given collocation candidate contains a collocation error may include: determining a first association measure using the reference database for the given collocation candidate; determining whether the first association measure satisfies a predetermined condition and identifying the given collocation candidate as proper if the first association measure satisfies the predetermined condition; determining an additional association measure for a variation of the given collocation candidate using the reference database; and determining whether or not the collocation candidate contains an error based upon the additional association measure of the variation. An indicator of whether a collocation candidate contains a collocation error may be stored in a computer-readable memory.

As another example, a computer-implemented method for detecting collocation errors in a text sample using a reference database from a text corpus may include categorizing words in the text sample according to parts of speech using the processing system and identifying collocation candidates within the text sample based upon syntactic patterns in the text sample using the processing system. Whether a given collocation candidate contains a collocation error may be detected using the processing system, where the detecting includes: determining a first association measure using the reference database for the given collocation candidate; determining whether the first association measure satisfies a predetermined condition and identifying the given collocation candidate as proper if the first association measure satisfies the predetermined condition; determining an additional association measure for a variation of the given collocation candidate using the reference database; and determining whether or not the collocation candidate contains an error based upon the additional association measure of the variation. An indicator of whether a collocation candidate contains a collocation error may be stored in a computer-readable memory.

As a further example, a computer readable medium encoded with instructions for detecting collocation errors in an input text using a reference database extracted from a corpus of texts may include instructions for commanding a data processor to identify collocation candidates within the text sample based upon syntactic patterns in the text sample and detect whether a given collocation candidate contains a collocation error, where the detecting includes: determining a first association measure using the reference database for the given collocation candidate; determining whether the first association measure satisfies a predetermined condition and identifying the given collocation candidate as proper if the first association measure satisfies the predetermined condition; determining an additional association measure for a variation of the given collocation candidate using the reference database; and determining whether or not the collocation candidate contains an error based upon the additional association measure of the variation. The instructions may further command the processor to store an indicator of whether a collocation candidate contains a collocation error in a computer-readable memory.

BRIEF DESCRIPTION OF THE DRAWINGS

FIG. 2 is a depiction of seven types of lexical collocations along with examples.

FIG. 3 depicts an example calculation of a rank ratio association measure for entry into a reference database.

DETAILED DESCRIPTION

Figure 1:
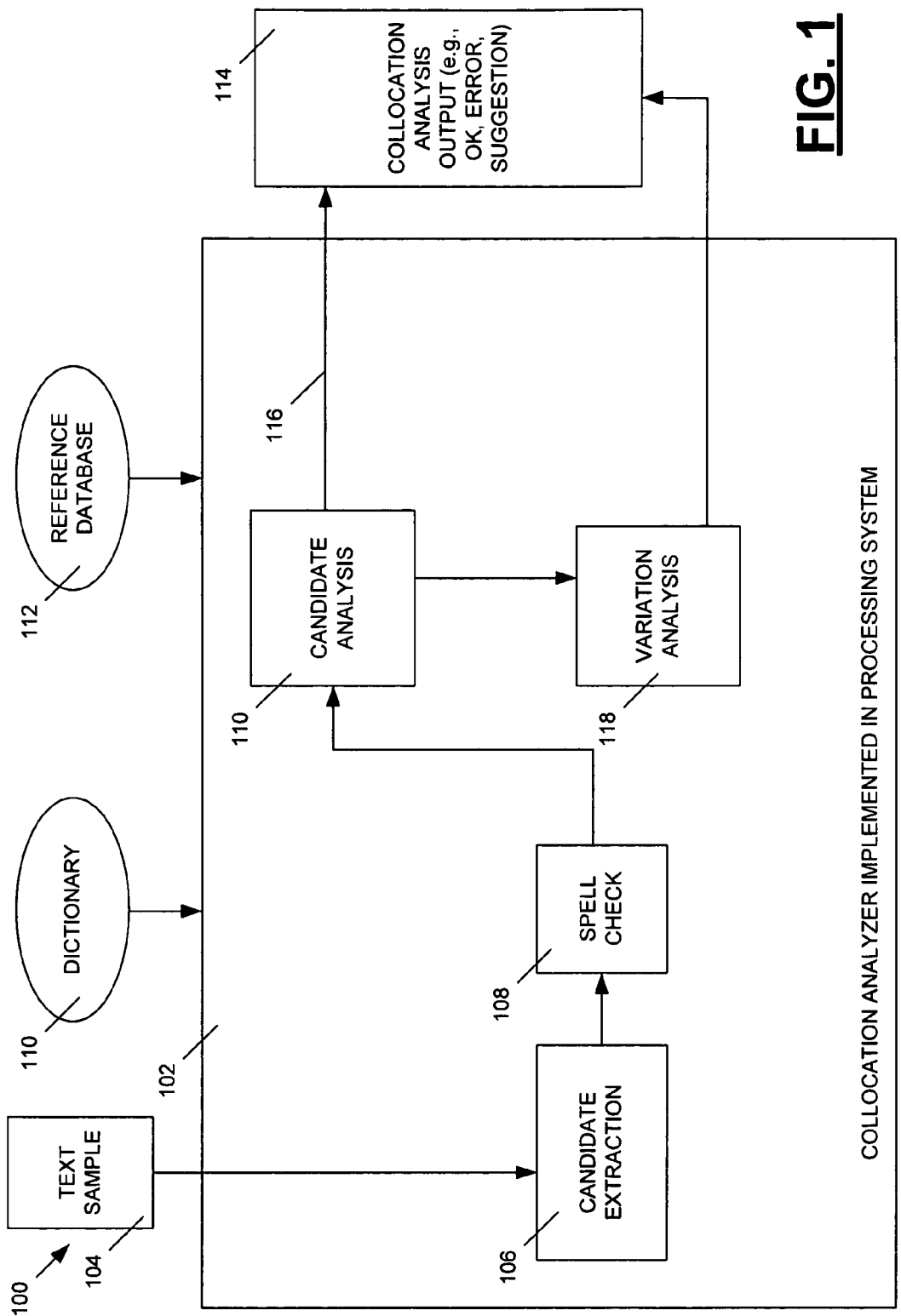
FIG. 1 is a block diagram depicting a computer-implemented collocation analyzer for determining whether collocation candidates identified within a text sample are proper collocations.

Exemplary computer systems and methods are described herein which automatically identify collocation errors and may suggest corrections. FIG. 1 is a functional block diagram depicting an exemplary computer-implemented system 100 for determining whether collocation candidates identified within a text sample are proper collocations, and thus OK, or whether such collocation candidates are errors. The system 100 includes a collocation analyzer 102 implemented in any suitable computer processing system. The collocation analyzer 102 includes functional blocks for candidate extraction 106, spell checking 108, candidate analysis 110, and variation analysis 118. The functionality may be implemented in the processing system, for example, via a suitable set of computer program instructions in any suitable programming language, such as C, C++, SQL, C#, MATLAB, ASP, Perl, PHP, Java, etc. Thus, the processing system can be specially programmed to carry out the functionality described herein. The processing system can be any suitable processing system, such as one or more conventional computer processors residing in one computing device, such as a personal computer (PC), or the processing system can include multiple processors distributed among multiple computing devices that can communicate via a network. The programming instructions may be structured as separate modules corresponding to the functional blocks illustrated in FIG. 1, for example, or may be structured in any other suitable way.

The collocation analyzer 102 receives a text sample 104 and performs candidate extraction at 106 to identify collocation candidates for further analysis. Every word sequence (or word string) in a text is a potential collocation. However, checking every word combination in a text to determine whether it is a proper collocation may be inefficient. Thus, certain syntactic patterns may be identified as being likely to contain collocations. To identify collocation candidates within a text sample 104 the collocation analyzer 102 may identify words of the text sample according to their grammatical relationship with other words in the text using a syntactic parser. Candidate extraction may also be accomplished using a part-of speech tagger. When utilizing a part-of-speech tagger, following identification of words by their parts of speech, the parts of speech associated with the words of the text sample may then be searched for patterns at block 106, such as those depicted in FIG. 2.

FIG. 2 illustrates eight noteworthy types of word combinations along with examples, all of which for the purpose of this disclosure may be considered to be possible collocation patterns. The number and types of word patterns that may be identified and analyzed is not limited to those listed in FIG. 2, however. As a general matter, a text sample 104 may be parsed to check for word patterns matching all of those listed in FIG. 2, as well as other patterns of interest to the system designer. Alternatively, in one embodiment, a text sample 104 may be parsed for collocation candidates matching fewer patterns, such as, for example, the Verb+Direct Object (L2), Adjective+Noun or Noun+Noun (L3), Noun of Noun (L5), and Verb+Adverb (L7) patterns depicted in FIG. 2. In addition to identifying collocation candidates based on syntactic patterns alone, further filtering may be added to further improve identification of improper collocations. For example, a filter may be included to ignore certain strings such as those that include sentential complements, such as "think" and "believe." Upon location of a syntactic pattern matching one of the desired syntactic patterns, the words making up the pattern are identified as a collocation candidate for further downstream processing.

With reference back to FIG. 1, following identification of collocation candidates at 106, a spell check may be performed at 108 through the aid of a dictionary 110. Collocation candidates that contain misspellings may not be locatable in downstream reference databases. Thus, spell checking at 108 may enable avoidance of some false collocation error identifications. Any of a number of spell checkers may be utilized at 108. For example, in one embodiment, the spell checker may initially compare words in a collocation candidate to a list of real words in any suitable manner, such as through conventional spell checking approaches known to those of ordinary skill in the art. If the word is not found in the list, a misspelling is presumed and a lookup algorithm may be used to find a closest word within a minimum edit distance of the word in the text sample. To find the point in the list from which to start the look-up, the spell checker may use a binary search to find the first listed word whose initial 3-letter sequence matches that of the misspelled word. From there, the search may proceed word by word in each direction until either a good-enough match is found or the initial three letters no longer match. Other spell checking methods and applications will be apparent to one skilled in the art.

Following spell checking, an analysis may be performed on a collocation candidate at 110 by accessing a reference database 112 to determine whether the collocation candidate is a proper collocation or whether the collocation candidate is an error. The reference database 112 may be created from a corpus of previously existing texts such as books, magazines, websites, etc., such as the Google N-gram Corpus, 2006, for example, which may contain billions of strings of words. Smaller databases of strings of two or more words (e.g., two to five words, etc.) containing, for example, millions of strings may also be utilized. The database may contain a listing of strings of words found within the corpus of texts along with a metric identifying a frequency with which each string is found within the corpus. Strings of words that occur more often in the corpus of text than would be expected by chance may be indicative of a collocation.

For example, a record in the reference database may identify a collocation along with an association measure associated with that collocation, wherein the association measure reflects the frequency of the collocation and the words in the collocation. The association measure can be, for example, a rank ratio, wherein a rank ratio reflects a ranking of the given context by virtue of its frequency of use with the given word in the reference corpus compared to its expected rank by virtue of its frequency of use with any word in the same reference corpus. The reference database may contain precomputed association measures, such as rank ratios, associated with strings within the database or data associated with the strings in the database that may be partially precomputed toward calculating an association measure. For example, for a given string in the reference database, a record may contain precomputed local and global ranks and/or precomputed frequencies of the string in the corpus, or combinations thereof. The reference database may also contain raw data in other forms, such as a listing of strings of words, wherein the frequencies of the appearance of the strings in the corpus is computed at runtime. Other association measures applicable to the present disclosure include, for example, z-score, t-score, chi-squared test, log-likelihood, mutual information, etc. U.S. Patent Application Publication 2005/0222837, entitled "Lexical Association Metric for Knowledge-free Extraction of Phrasal Terms," and U.S. Patent Application Publication No. 2008/0183463, entitled "Cooccurrence and Constructions," describe calculations of rank ratios in detail and are both herein incorporated by reference in their entirety.

FIG. 3 depicts an example calculation of a rank ratio rank measure for entry into a reference database. For a collocation "east side" a word, "east," is identified as a key word. For example, logic may be utilized that ignores certain articles or numbers as key words. Identifying east as a key word, the context for the use of the word, east, is "_side." Additional contexts which utilize the key word, east, are identified, and global and local frequencies are calculated for the context for the use of the word and additional contexts which utilize the key word. A global frequency identifies the overall frequency of a context in general, regardless of what word fills the blank in the corpus of texts. A local frequency identifies the number of times that the key word fills the blank. The list of contexts is then ranked according to the global frequency and the local frequency, and the rank of the collocation "east side" is noted during each sorting. The rank ratio is then calculated by dividing the rank noted during the global frequency sort by the rank noted during the local frequency sort. Additionally, a second rank ratio could be calculated focusing on the word "side" as a key word. The combination of the two rank ratios, along with additional rank rations, could then be combined via averaging or other normalization to compute a composite rank ratio that could then be used as an association measure.

With reference back to FIG. 1, the candidate analysis 110 looks up or computes an association measure for the collocation candidate utilizing the reference database 112. If the association measure meets a predetermined condition, such as being greater than a preset threshold value, the collocation candidate may be labeled as being proper in the collocation analysis output 114 via 116. If the association measure for the collocation candidate does not meet the predetermined condition or is not found, processing may proceed to a further analysis of a variation of the collocation candidate, at 128. An association measure may be looked up or calculated using the reference database 112 for the variation of the collocation candidate, and based on the association measure for the variation, the collocation candidate may be identified as being proper or in error in the collocation analysis output 114.

Figure 4:
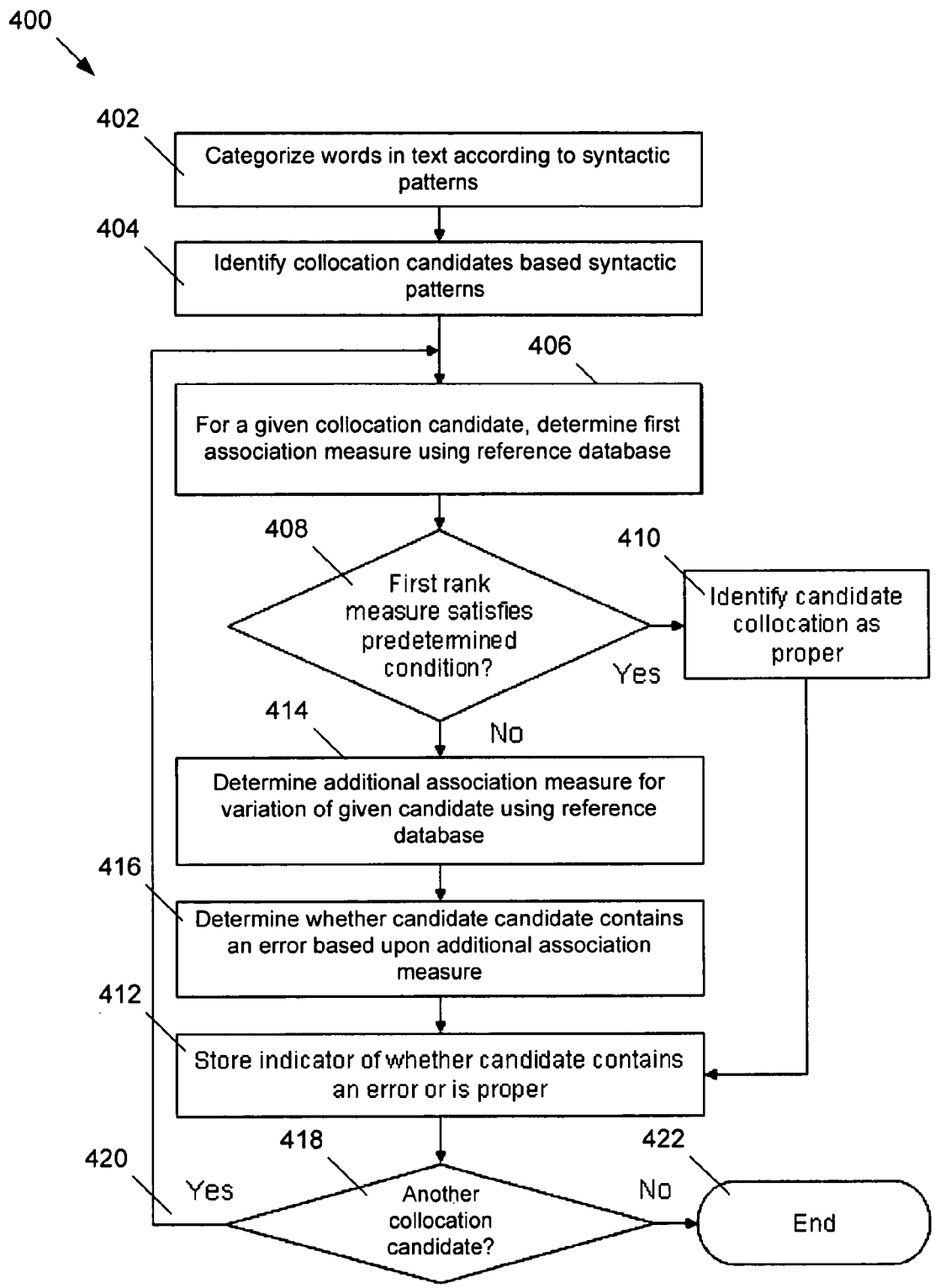
FIG. 4 is a flow diagram depicting an example processing flow for detecting collocation errors in a text sample.

FIG. 4 is a flow diagram depicting an example processing flow for detecting collocation errors in a text sample. The process may begin by categorizing words in a text sample according to their parts of speech at 402. Using the categorization of the words according to parts of speech, collocation candidates are identified based on syntactic patterns within the categorized text at 404. (Collocation candidates could also be identified using syntactic parsing, as described herein above, or other methods apparent to one skilled in the art.) For a given collocation candidate, a first association measure is determined using the reference database, as shown at 406. A decision is then made based on the first association measure at 408. If the first association measure satisfies a predetermined condition, such as being greater than a preset threshold value, then the collocation candidate is identified as being proper at 410, and processing proceeds to 412, where an indication that the collocation candidate is proper is stored in a computer-readable memory. The choice of the predetermined condition, e.g., a threshold value is within the purview of one of ordinary skill in the art, and can be determined for example, based upon trial and error testing using a known text sample and a known reference database such that desired performance in identifying proper collocations and rejecting improper collocations is achieved. For example, the predetermined condition can be a number 1, 1.5, 2, 2.5, 3, 3.5, 4, 4.25, 5, or possibly lower or higher, where the rank ratio must be greater than the number (e.g. rank ratio(collocation candidate)>number) to meet the predetermined condition. If the first association measure fails to satisfy the predetermined condition at 408, the processing proceeds to 414, where an additional association measure for a variation of the given collocation candidate is determined using the reference database. Variations that may be considered at 414 include minor grammar variations such as article and inflection variations as well as synonym variations, as described in further detail herein below.

Based on the additional association measure for a variation determined at 414, a determination is made as to whether the collocation candidate contains an error at 416. For example, if the association measure of the collocation candidate does not meet the predetermined condition but an additional association measure of a variation of the collocation candidate does meet the predetermined condition, or another condition (e.g., perhaps with a different threshold value), then the collocation candidate may be identified as being proper but having a minor error. This may occur in instances where the collocation candidate contains a minor grammatical error (e.g., "strong a tea" instead of "strong tea") but still uses the proper words for a recognized collocation. In such a case, although the collocation candidate contains may contain a grammar error, the collocation candidate does not contain a collocation error and is, thus, identified as being proper. Alternatively, if the additional association measure fails to meet the predetermined condition (or other condition), then the collocation candidate may be identified as being erroneous. An indicator of whether the candidate contains a collocation error or is proper is stored in a computer-readable memory at 412, and the process may be repeated for another collocation candidate or ended if there are no further collocation candidates to be analyzed, as noted at 418, 420, 422.

Figure 5:
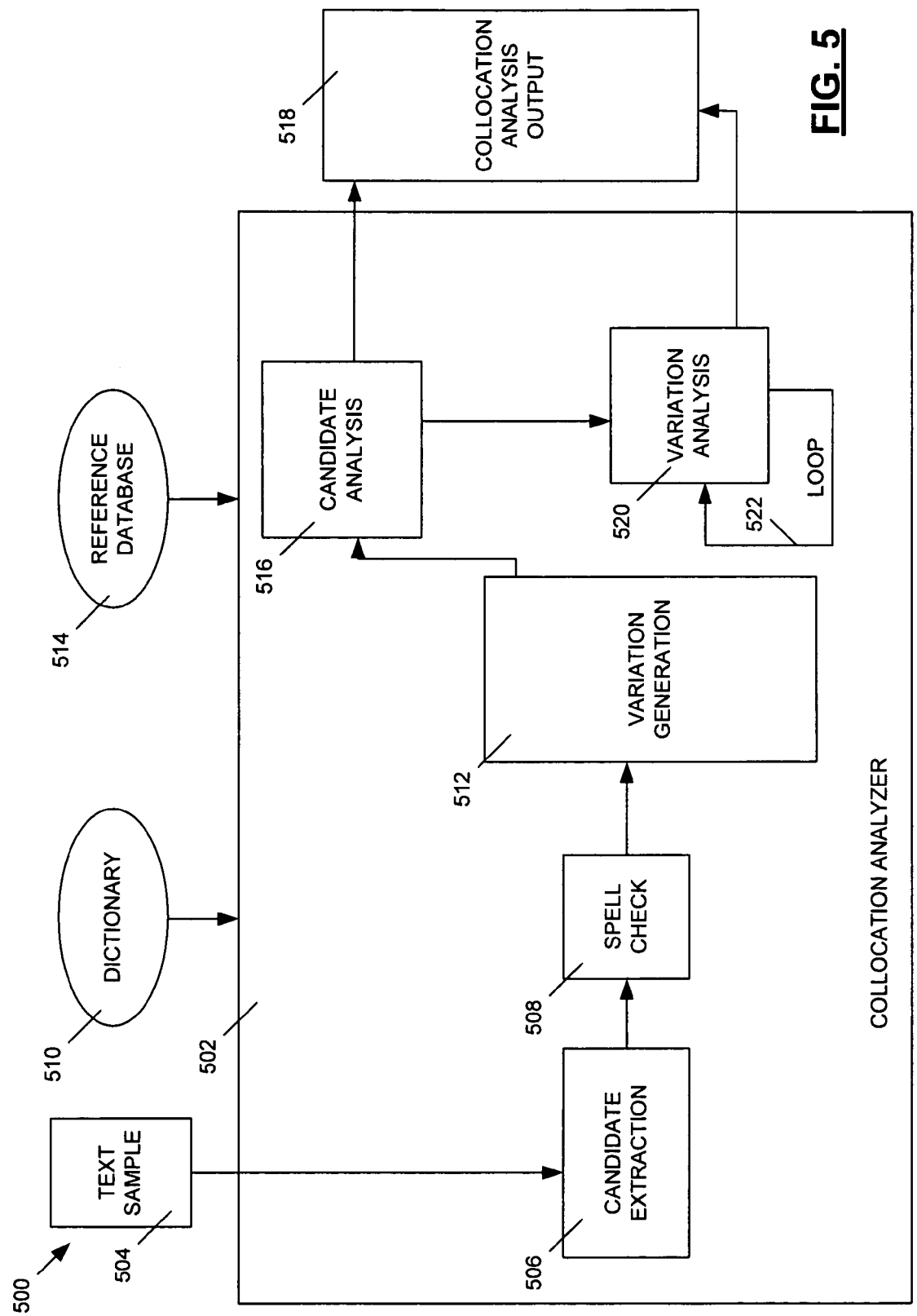
FIG. 5 is a block diagram depicting internal operations within a collocation analyzer.

FIG. 5 is a functional block diagram illustrating internal operations within a collocation analyzer 502 according to another example. A text sample 504 is received or accessed by the collocation analyzer 502 and undergoes candidate extraction at 506 to identify collocation candidates within the text sample 504. Collocation candidates could be identified using syntactic parsing or part-of-speech tagging and pattern matching, for example, as described herein above, or via other methods apparent to one skilled in the art. A spell check 508 may be performed to correct any errors in the collocation candidates utilizing a dictionary 510. At 512, variations of a collocation candidate may be generated to aid in downstream analysis procedures. The variations may include, for example, eliminating or adding articles, such as "a," "an," and "the" to the collocation candidate, changing inflections of words of the collocation candidate such as changing plural to singular, and vice versa, and such as changing tense, and replacing one or more words of the collocation candidates with synonyms looked up from a thesaurus database, such as WordNet or Roget's Thesaurus. The variations are generated to aid in locating correct collocations in the reference database 514 that may contain minor differences from proper collocations in the database 514. The variations may also be used to help determine whether another word combination that, for example, differs by a synonym of a word in a collocation candidate may be more appropriate such that a suggested change can be recommended by the system. It will be appreciated that in the example of FIG. 5, variations of collocation candidates can be generated within the collocation analyzer 502 implemented in a processing system, whereas in the FIG. 1 example, variations of collocation candidates may be pre-arranged in the reference database 112. In addition, in the FIG. 5 example, some variations of collocation candidates, e.g., those for inflection variations and/or article variations, can also be pre-arranged in the reference database 514, in which case it may be desirable to handle synonym variations at block 512.

An analysis is then performed at 516 on the collocation candidate to determine whether it satisfies a predetermined condition, such as its association measure satisfying a threshold. If so, then the collocation candidate is identified as being proper in the collocation analysis output 518. The analysis 516 on the collocation candidate may also analyze synonym variations from the variation generation 512 to determine if, even though the collocation candidate meets the predetermined condition, a more appropriate word combination may exist. For example, even if the collocation candidate meets the predetermined condition, if a variation containing a synonym of a word in the collocation candidate surpasses the association measure of the collocation candidate by more than an error threshold (e.g., 5%, 20%, 25%, 30%, 35%, 40%, 50%, 100%, 200%, 500%, etc.), then the collocation candidate may be in error, and processing may be directed to further analysis of variations at 520.

If the collocation candidate is deemed to be in error, such as via having a low association measure, or if no data is found for the collocation candidate in the reference database 514, then an analysis may be performed on variations of the collocation candidate at 520. In this stage, variations generated at 512, such as variations in articles used within the collocation candidate, are analyzed to determine if the collocation candidate is proper. A determination that a collocation candidate is proper based on a variation meeting the predetermined criteria may occur regularly in non-native English speakers, where minor grammar or other errors may mask a proper collocation usage. For example, if a collocation candidate is identified as "visit museum," a variation generated at 512 may be the more common "visit the museum." While "visit museum" may not meet the predetermined condition, "visit the museum" may, and the collocation candidate may be marked as proper through the analysis at 520. In such a case, the collocation candidate may be flagged as a potential grammar or other error that should be reviewed. The variation analysis may continue at 520 via loop 522 until the collocation candidate is deemed proper or until each variation generated for a collocation candidate is processed. If none of the variations are able to satisfy the predetermined condition, then the collocation candidate may be noted as being an error.

As described above with respect to FIG. 1, several different types of variations may be considered in determining whether a collocation candidate is a proper collocation. For example, in an article variation, if the collocation candidate is "have knowledges," article variants may include "have the knowledges." Noun and verb inflection variations may also be generated. For the collocation candidate "have knowledges," inflectional variations may include "have knowledge." Combination variations may also be generated containing article variations and inflection variations such as "have a knowledge" and "have the knowledge." These variants may be analyzed as described above. These variants maximize the chance of finding data regarding the appropriateness of a collocation for a given candidate.

Synonym lookups may also be performed during variation generation. Nouns, verbs, adjectives, etc. within a collocation candidate may be varied through the use of a thesaurus or other resource to identify synonym variations. For example, for a collocation candidate "powerful tea," a synonym lookup may identify "strong tea" as a synonym variation.

In one embodiment, the exclusion of article and inflection variation generation may increase processing speed for analysis of a collocation candidate. Such performance gains may be realized without a loss in collocation candidate analysis abilities via use of a more robust reference database. For example, the reference database may have strings of text that are related as having only an article or inflection difference between them linked, such that by retrieving a association measure or other data for one collocation candidate, data on article and inflection variants of the collocation candidate may be easily located and analyzed. In such a case, only synonym lookups may be performed in the variation generation, with article, inflection, and other variation identification and analysis being performed elsewhere in the process, such as during an access to the robust reference database.

Figure 6:
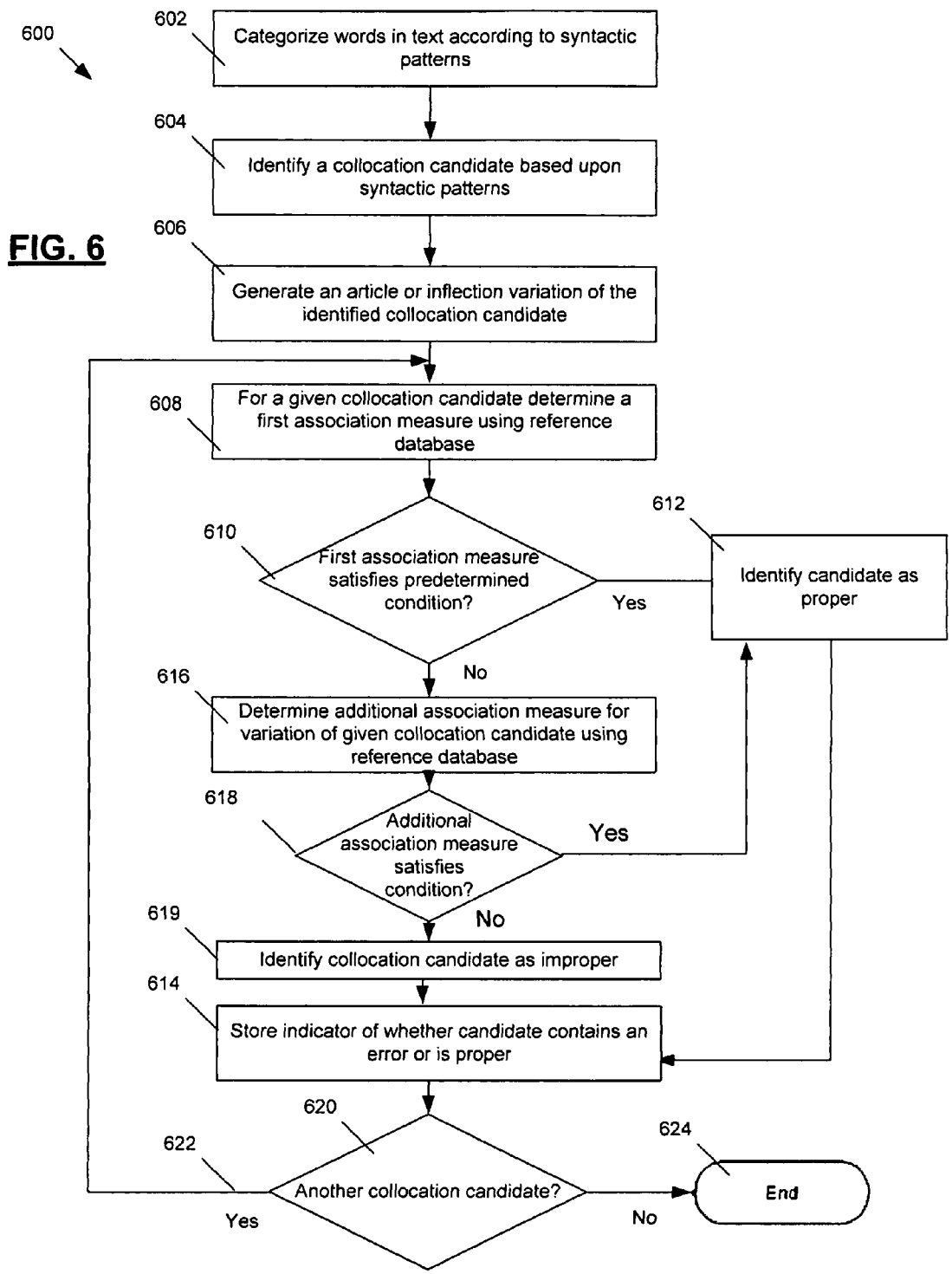
FIG. 6 is a flow diagram depicting steps for identifying whether a collocation candidate is proper utilizing an article/inflection variation.

FIG. 6 is a flow diagram depicting steps for identifying whether a collocation candidate is proper utilizing an article/inflection variation. Words in the text sample are categorized according to their parts of speech at 602 and collocation candidates are identified at 604 based upon syntactic patterns within the text sample. (Collocation candidates could also be identified using syntactic parsing, as described herein above, or other methods apparent to one skilled in the art.) For an identified collocation candidate, an article or inflection variation of the collocation candidate is generated at 606. For a collocation candidate, a first association measure (such as a rank ratio as described elsewhere herein) is determined for the collocation candidate using a reference database at 608. At 610, a determination is made as to whether the first association measure meets a predetermined condition. If the first association measure does satisfy the predetermined condition (such as described elsewhere herein), then the collocation candidate is identified as being proper at 612, and an indicator or such is stored in a computer-readable memory at 614.

If the first association measure does not satisfy the predetermined condition at 610, then an additional association measure for a variation of the collocation candidate is determined using the reference database. For example, an association measure may be calculated for an article variation of the collocation candidate. A determination as to whether the additional association measure satisfies the predetermined condition or other condition is made at 618. If the additional association measure satisfies such a condition, then the collocation candidate is identified as being proper at 612, albeit with some minor error, such as a minor grammatical error. For example, if the association measure for the article variation of the candidate meets the predetermined condition, then the collocation candidate may be identified as a proper collocation. If the additional association measure fails to satisfy the predetermined condition, then the candidate is identified as being improper at 619. An indicator of whether the collocation candidate contains an error or is proper is stored at 614, and the process continues for further collocation candidates or ends, as shown at 620, 622, 624. An output can be also be made to the system user that a given collocation contains an error and can suggest an alternative, e.g., without the grammar error. This type of functionality may be useful in conjunction with word processing software and can be implemented as a functional module similar to that for spell checking and grammar checking.

According to one example, assessing whether collocation candidates contain errors or are proper can be used to create a database of erroneous or oft-confused collocations that may be encountered. Such databases could be useful for example in word processing applications for quick lookups of collocation candidates to identify erroneous collocations and for teaching purposes in a language learning tool. In addition to listing common collocation errors, error records could include a more correct collocation along with the error collocation.

Figure 7:
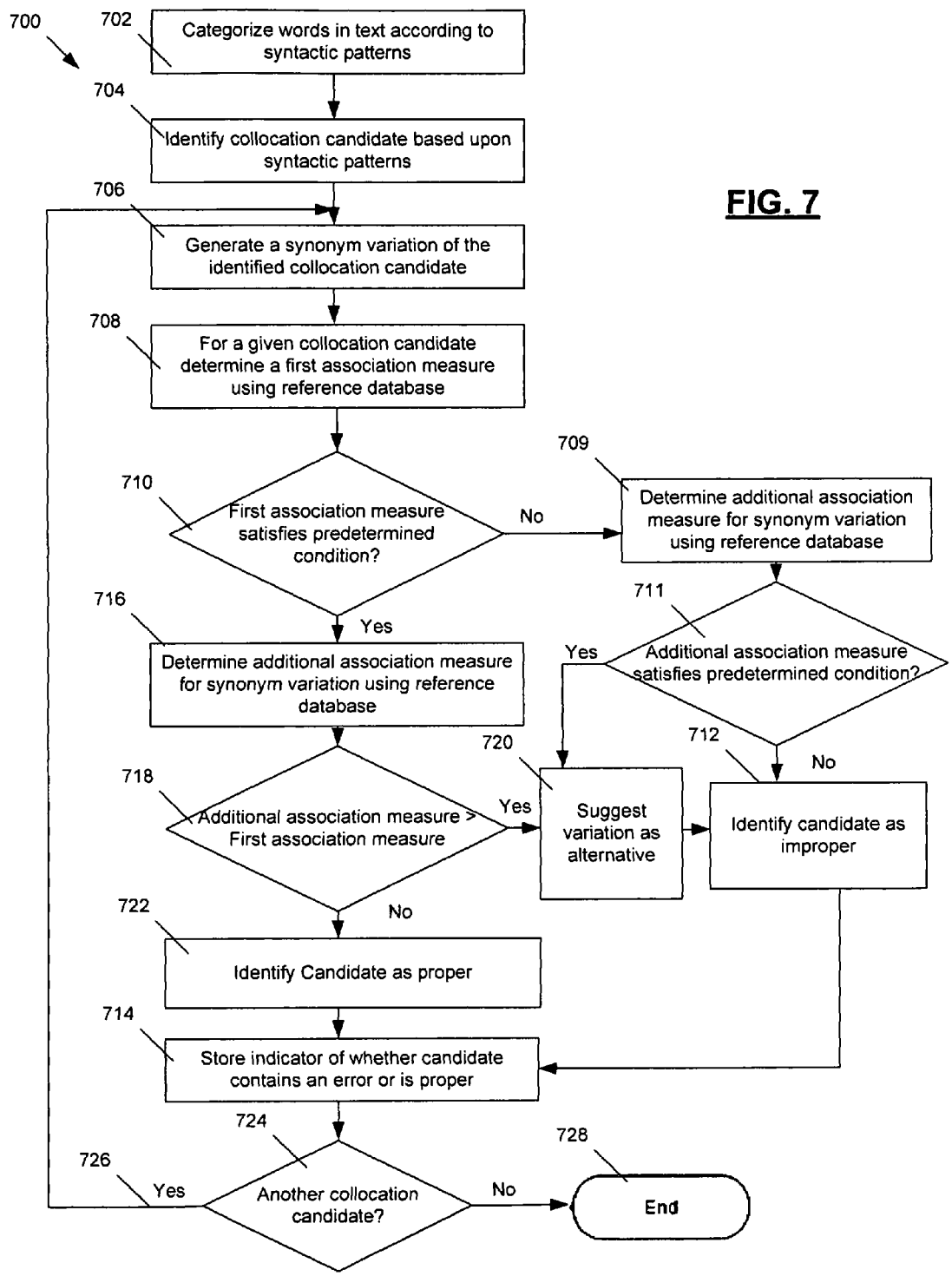
FIG. 7 is a flow diagram depicting steps for identifying whether a collocation candidate is proper utilizing a synonym variation.

FIG. 7 is a flow diagram depicting steps for identifying whether a collocation candidate is proper utilizing a synonym variation. Words in the text sample are categorized according to their parts of speech at 702 and collocation candidates are identified at 704 based upon syntactic patterns within the text sample. (Collocation candidates could also be identified using syntactic parsing, as described herein above, or other methods apparent to one skilled in the art.) For an identified collocation candidate, a synonym variation of the collocation candidate may be generated at 706. Synonyms can be looked up from an electronic thesaurus such as known to those of ordinary skill in the art. There can be many synonyms for a given word, and it is not necessary to examine all possible synonyms. For example, it may be desirable to simply check the most highly ranking synonym as arranged in the thesaurus, the two most highly ranking synonyms, the three most highly ranking synonyms, etc. For a given collocation candidate, a first association measure (such as a rank ratio as described elsewhere herein) is determined using a reference database at 708. A determination as to whether the first association measure satisfies a predetermined condition (such as described elsewhere herein) is made at 710. If the first association measure does not meet the predetermined condition, then the collocation candidate is identified as being improper at 712, and an indicator of such is stored in a computer-readable memory at 714. Additionally, an additional association measure is determined at 709 for the synonym variation, and an inquiry as to whether the additional association measure satisfies the predetermined condition is made at 711. If the additional association measure satisfies the predetermined condition, then the synonym variation is suggested as a replacement for the collocation candidate at 720. Processing then proceeds at 712 as described above.

If the first association measure satisfies the predetermined condition at 710, the flow proceeds to 716. At 716, an additional association measure is determined for the synonym variation of the collocation candidate using the reference database at 716, assuming that a synonym variation was actually identified at step 706 (if no synonym variation were identified for a given candidate variation at step 706, then the flow would simply skip to step 724 for selection of another collocation candidate). If the additional association measure is better than the first association measure by more than an error threshold 718, then the synonym variation is deemed better than the collocation candidate. The error threshold is a value that identifies how much better than a collocation candidate a synonym variation must be to be considered a better alternative. For example, a synonym variation having an association measure that is only slightly better than the association measure of the collocation candidate may not indicate an error, as both options may be acceptable. Upon determining that the additional association measure is better than the first association measure by more than the error threshold, the synonym variation is suggested as a replacement for the collocation candidate at 720, and the collocation candidate is identified as being improper at 712. If the additional association measure is not better than the first association measure by more than the error threshold, then the collocation candidate is identified as being proper at 722 and an indicator of such is stored at 714. The process may then be repeated for another collocation candidate or ended, as indicated at 724, 726, 728.

Figure 8:
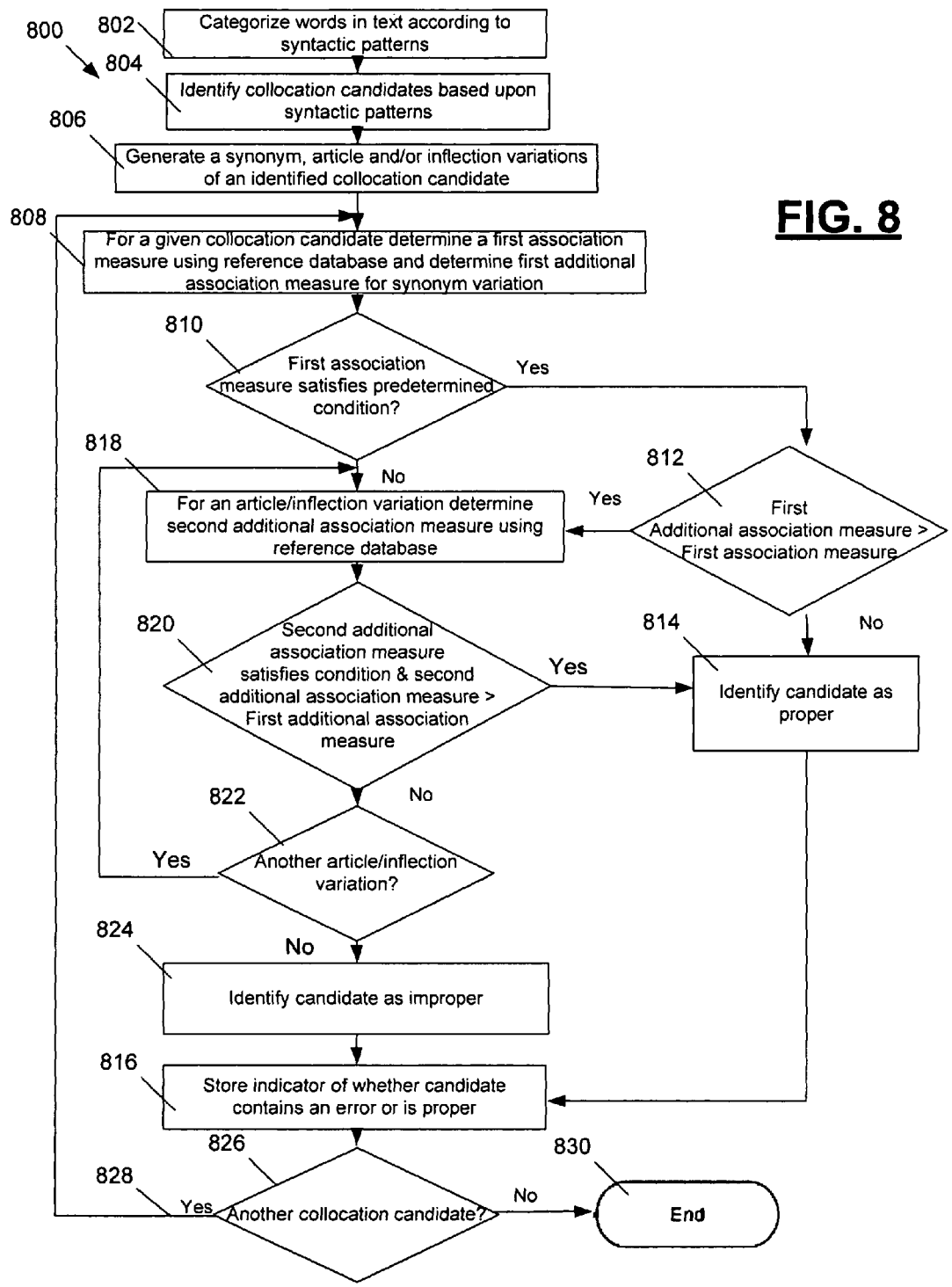
FIG. 8 is a flow diagram depicting steps for identifying whether a collocation candidate is proper utilizing a synonym variation and an article/inflection variation.

FIG. 8 is a flow diagram depicting steps for identifying whether a collocation candidate is proper utilizing a synonym variation and article and inflection variations. Words in the text sample are categorized according to their parts of speech at 802 and collocation candidates are identified at 804 based upon syntactic patterns within the text sample. (Collocation candidates could also be identified using syntactic parsing, as described herein above, or other methods apparent to one skilled in the art.) For an identified collocation candidate, a synonym variation of the collocation candidate is generated at 806 along with an article or inflection variation.

For a given collocation candidate, a first association measure is determined using the reference database, and a first additional association measure corresponding with the synonym variation is determined. A determination is made at 810 as to whether the first association measure satisfies the predetermined condition. If the first association measure does satisfy the predetermined condition (step 810), then another determination is made at 812 as to whether the first additional association measure is better than the first association measure by some predetermined amount (e.g., the first additional association measure is greater than the first association measure by a threshold amount such as 5%, 20%, 25%, 30%, 35%, 40%, 50%, 100%, 200%, 500%, etc.). The threshold amount may be selected based on experimentation using a collection of known text or other means as would be apparent to one skilled in the art. If the first additional association measure corresponding with the synonym variation is not better than the first association measure by the predetermined amount, then the collocation candidate is identified as being proper at 814 and an indicator of such is stored in a computer readable memory at 816.

If the first association measure does not satisfy the predetermined condition or if the first additional association measure is better than the first association measure by some predetermined amount (e.g., the additional association measure is greater than that of the first association measure by 20%, 30%, 40%, 50%, etc.), then a second additional association measure is determined for an article/inflection variation at 818. A determination is made at 820 as to whether the second additional association measure satisfies the predetermined condition, and a determination is made as to whether the second additional association measure corresponding to the article/inflection variation is better than the first additional association measure corresponding to the synonym variation by some predetermined amount. If both determinations at 820 are true, then the collocation candidate is identified as being proper at 814. Otherwise the internal loop 818, 820 may be repeated for another article/inflection variation at 822 until all article/inflection variations are exhausted, until a user instruction to stop is received, or until a time-out condition is achieved. If no second additional association measure meets the requirements of the determination at 820, then the collocation candidate is identified as being improper at 824, and an indicator of such is stored at 816. The process may then be repeated for another collocation candidate or ended, as indicated at 826, 828, 830. Although not shown in FIG. 8 (for purposes of avoiding excessive complexity in the drawing), it will be appreciated that the ability to output a suggested variation of the collocation candidate as a more proper alternative can be included in the example of FIG. 8, in a manner such as described above in connection with FIG. 7, in which case the suggested alternative can be based upon a synonym variation, an article variation, an inflection variation, or any combination thereof. It should be noted that article/inflection variations of the synonym variation may also be considered at 812 and 820 by considering association measures associated with the article/inflection variations of the synonym variations in the recited inequalities.

The identifications of proper and erroneous collocations made by a collocation analyzer may be useful in themselves. Moreover, functionality for identifying proper and erroneous collocations may be integrated into a downstream product. For example, such identifications could be used as a basis for scoring an academic examination or test (e.g., such as various standardized tests used for college admissions), such as in conjunction with E-rater® scoring from Educational Testing Service or other computerized test scoring, or could be used in conjunction with word processing software to provide suggestions for correcting identified collocation errors (e.g., to supplement conventional spell checking and grammar checking functionality of word processing programs). A collocation analyzer may receive a text sample and parse collocation candidates from the text sample. The collocation analyzer may categorize collocation candidates as being proper, in error, or may offer a suggestion. An annotated text generator may receive the text sample as well as identifications of whether collocation candidates identified within the text sample are proper or in error along with suggestions for changes. The annotated text generator may produce an annotated text that is substantially similar in content with the text sample. The annotated text generator may note collocation candidates identified as being erroneous in the annotated text, such as via highlighting. Additionally, the annotated text generator may provide suggested edits, such as more proper collocations, in the annotated text or may automatically insert suggested edits into the annotated text.

It will be appreciated that many variations can be made to the exemplary embodiments described herein without departing the scope of the invention. For example, the order and appearance of certain steps in determining the appropriateness of a collocation candidate may be modified as would be understood by one skilled in the art. For example, a spell check may be performed before a candidate extraction or not at all. Additionally, variation generation may only occur after an initial analysis on a collocation candidate after it is deemed that the collocation candidate's association measure does not meet the predetermined condition or not at all. Moreover, the assessment of synonym variations, article variations, and inflection variations in generating variations of collocation candidates is not limited to the orders disclosed herein and may occur in any order. Further, as noted above the ability to output a suggested variation of the collocation candidate as a more proper alternative can be included in the examples of FIG. 6 and FIG. 8, in a manner such as described above in connection with FIG. 7, in which case the suggested alternative can be based upon a synonym variation, an article variation, an inflection variation, or any combination thereof. In addition, an assessment of multiple variations (1, 2, 5, etc.) may be carried out at 610, 616, 618 in FIG. 6 and 709, 711 and 716, 718 in FIG. 7 should multiple variations be generated at 606 and 706 in FIGS. 6 and 7, respectively. Further, an assessment of multiple synonym variations may be carried out at 818, 820 in FIG. 8.

Figure 9A:
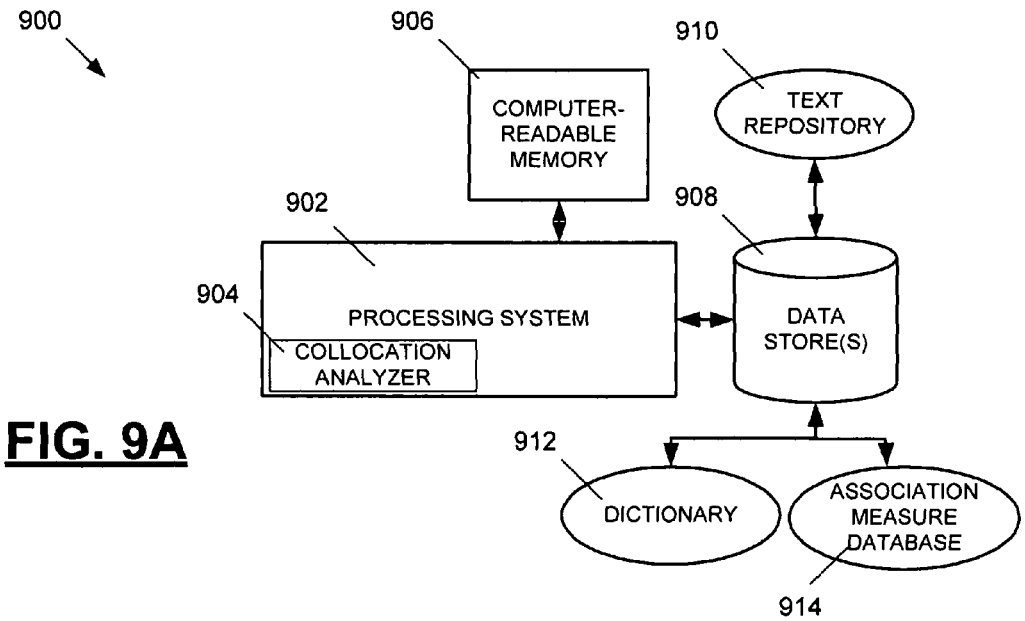
FIGS. 9A, 9B, and 9C depict example processing systems for use in implementing a collocation analyzer system.
Figure 9B:
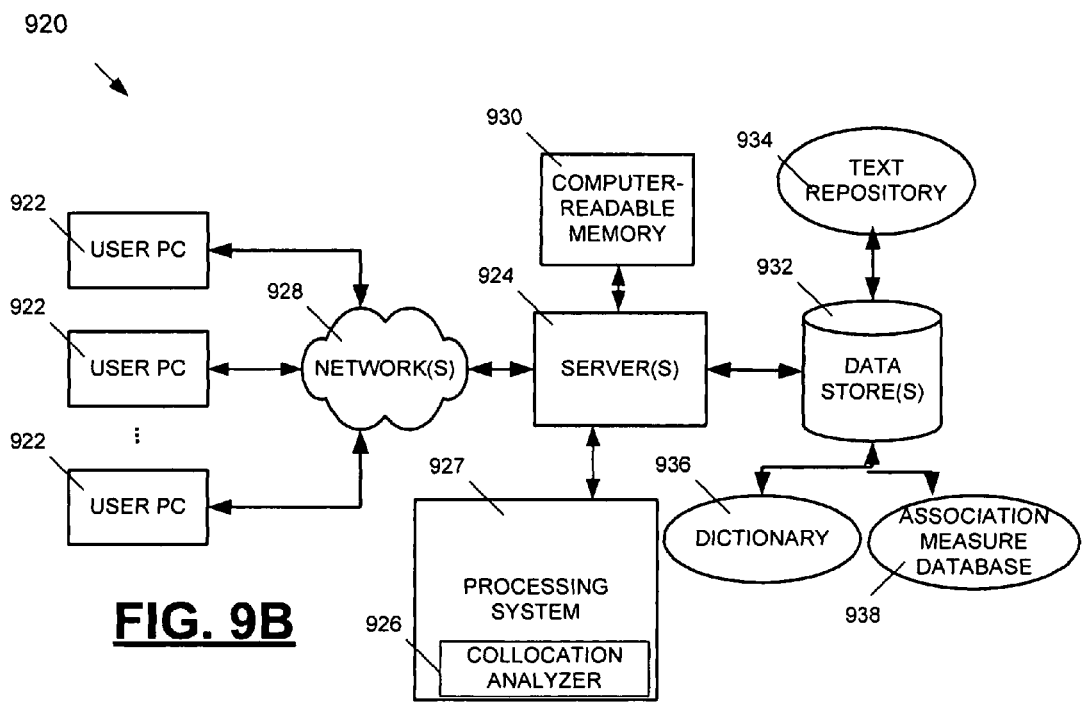
Figure 9C:
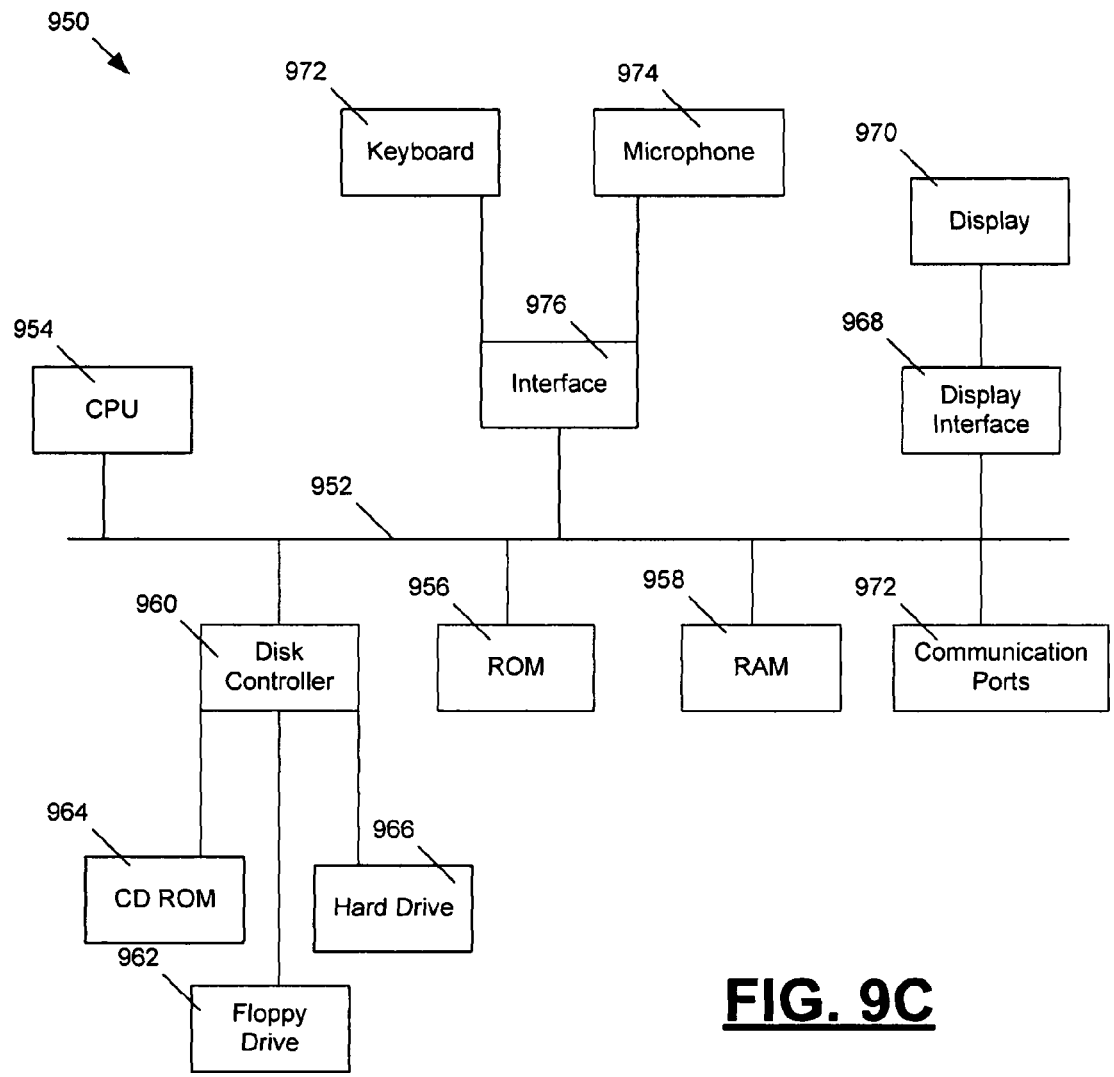

FIGS. 9A, 9B, and 9C depict example systems for use in implementing a collocation analyzer system. For example, FIG. 9A depicts an exemplary system 900 that includes a stand alone computer architecture where a processing system 902 (e.g., one or more computer processors) includes a collocation analyzer 904 being executed on it. The processing system 902 has access to a computer-readable memory 906 in addition to one or more data stores 908. The one or more data stores 908 may contain a text repository 910 as well as a dictionary 912 and an association measure database 914.

FIG. 9B depicts a system 920 that includes a client server architecture. One or more user PCs 922 accesses one or more servers 924 running a collocation analyzer 926 on a processing system 927 via one or more networks 928. The one or more servers 924 may access a computer readable memory 930 as well as one or more data stores 932. The one or more data stores 932 may contain a text repository 934 as well as a dictionary 936 and an association measure database 938.

FIG. 9C shows a block diagram of exemplary hardware for a system 950 that may be used to contain and/or implement the program instructions of system embodiments of the present invention. A bus 952 may serve as the information highway interconnecting the other illustrated components of the hardware. A processing system 954 labeled CPU (central processing unit) (e.g., one or more computer processors), may perform calculations and logic operations required to execute a program. A processor-readable storage medium, such as read only memory (ROM) 956 and random access memory (RAM) 958, may be in communication with the processing system 954 and may contain one or more programming instructions for performing the method of developing sentence-based test items. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 956 to be displayed on a display 970 in audio, graphic, or alphanumeric format. Communication with external devices may optionally occur using various communication ports 972.

In addition to the standard computer-type components, the hardware may also include data input devices, such as a keyboard 972, or other input device 974, such as a microphone, remote control, pointer, mouse and/or joystick.

Many other processing systems will be apparent to one skilled in the art. For example, the collocation analyzer may operate in a distributed processing environment where one or more processors may perform one or more of the steps to identify the appropriateness of a collocation candidate. The one or more processors may operate on a single or multiple computer or server machines. The processing system can be specially programmed to execute the steps described using any suitable programming language such as C++, SQL, C#, MATLAB, ASP, Perl, PHP, Java, etc., the implementation of which is within the purview of one of ordinary skill in the art.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While the present invention has been described in terms of exemplary embodiments, it will be understood by those skilled in the art that various modifications can be made thereto without departing from the scope of the invention as set forth in the claims.

It is claimed:

1. A computer-implemented system for detecting collocation errors in a text sample using a reference database from a text corpus, the system comprising:
   a processing system; and
   a computer-readable memory coupled to the processing system,
   the processing system being configured to execute steps comprising:
      identifying collocation candidates within the text sample based upon syntactic patterns in the text sample;
      detecting whether a given collocation candidate contains a collocation error, the detecting including:
      determining a first association measure using the reference database for the given collocation candidate;
      determining whether the first association measure satisfies a predetermined condition and identifying the given collocation candidate as proper if the first association measure satisfies the predetermined condition;
      determining an additional association measure for a variation of the given collocation candidate using the reference database;
      determining whether or not the collocation candidate contains an error based upon the additional association measure of the variation; and
   storing an indicator of whether a collocation candidate contains a collocation error in a computer-readable memory.

2. The computer-implemented system of claim 1, wherein the processing system is configured to execute steps comprising:
   generating a variation of the identified collocation candidates;
   wherein the additional association measure corresponds with the generated variation;
   wherein determining whether or not the collocation candidate contains an error based upon the additional association measure of the variation comprises:
      determining whether the additional association measure satisfies the predetermined condition, and
      if the additional association measure satisfies the first predetermined condition, identifying the given collocation candidate as proper; and
      identifying the given collocation candidate as containing a collocation error if the first association measure and the additional association measure fail to satisfy the predetermined condition.

3. The computer-implemented system of claim 2, wherein the processing system is configured to execute steps that include generating article variations and inflection variations.

4. The computer-implemented system of claim 2, wherein the processing system is configured to execute steps that include identifying a collocation candidate as a grammar error if one of the additional association measures is better than the first association measure.

5. The computer-implemented system of claim 1, wherein the processing system is configured to execute steps comprising:
   generating a variation of a collocation candidate containing a synonym of a word contained in the collocation candidate;
   wherein the additional association measure corresponds with the generated variation;
   wherein determining whether or not the collocation candidate contains an error based upon the additional association measure of the variation comprises:

identifying the collocation candidate as containing a collocation error if the additional association measure is better than the first association measure by more than an error threshold regardless of whether the first association measure satisfies the predetermined condition.

6. The computer-implemented system of claim 5, wherein the error threshold is 25%.

7. The computer-implemented system of claim 5, wherein the processing system is configured to execute steps that include identifying a variation having a corresponding highest additional association measure as a suggested replacement if the highest additional association measure satisfies the predetermined condition and is better than the first association measure.

8. The computer-implemented system of claim 5, wherein the processing system is configured to execute steps that include:
   generating an annotated text based on the input text;
   the generated annotated text highlighting collocation candidates identified as containing a collocation error and inserting identified suggested replacements into the annotated text.

9. The computer-implemented system of claim 1, wherein the processing system is configured to execute steps that include outputting a metric based on a number of collocation errors found in the text sample as part of a basis for a test score.

10. The computer-implemented system of claim 1, wherein the processing system is configured to execute steps that include correcting spelling errors in words in the text sample.

11. The computer-implemented system of claim 1, wherein the association measure is a rank ratio calculated by:
   identifying a plurality of contexts for a word within a collocation candidate;
   identifying a count of usages of an identified context within the text corpus as a global frequency;
   identifying a count of usages of the identified context where the word within the candidate phrase is included in the identified context as a local frequency;
   identifying a first rank based on the local frequency;
   identifying a second rank based on the global frequency; and
   determining an association measure based on the quotient of the second rank and the first rank.

12. The computer-implemented system of claim 1, wherein the syntactic patterns include a syntactic pattern selected from the group consisting of: verb plus noun phrase, verb plus prepositional phrase, verb plus direct object, adjective plus noun, noun plus noun, subject plus verb, noun of noun, adverb plus adjective, and verb plus adverb.

13. A computer-implemented method for detecting collocation errors in a text sample using a reference database from a text corpus, comprising:
   identifying collocation candidates within the text sample based upon syntactic patterns in the text sample using a processing system;
   detecting whether a given collocation candidate contains a collocation error using the processing system, the detecting including:
      determining a first association measure using the reference database for the given collocation candidate;
      determining whether the first association measure satisfies a predetermined condition and identifying the given collocation candidate as proper if the first association measure satisfies the predetermined condition;
      determining an additional association measure for a variation of the given collocation candidate using the reference database;
      determining whether or not the collocation candidate contains an error based upon the additional association measure of the variation; and
   storing, using the processing system, an indicator of whether a collocation candidate contains a collocation error in a computer-readable memory.

14. The computer-implemented method of claim 13, further comprising
   generating, using the processing system, a variation of the identified collocation candidates;
   wherein the additional association measure corresponds with the generated variation;
   wherein determining whether or not the collocation candidate contains an error based upon the additional association measure of the variation comprises:
      determining whether the additional association measure satisfies the predetermined condition, and
      if the additional association measure satisfies the first predetermined condition, identifying the given collocation candidate as proper; and
      identifying the given collocation candidate as containing a collocation error if the first association measure and the additional association measure fail to satisfy the predetermined condition.

15. The computer-implemented method of claim 14, wherein generating variations of the identified candidate phrases includes generating article variations and inflection variations.

16. The computer-implemented method of claim 14, further comprising identifying, using the processing system, a collocation candidate as a grammar error if the additional association measure is better than the first association measure.

17. The computer-implemented method of claim 13, further comprising:
   generating, using the processing system, a variation of a collocation candidate containing a synonym of a word contained in the collocation candidate;
   wherein the additional association measure corresponds with the generated variation;
   wherein determining whether or not the collocation candidate contains an error based upon the additional association measure of the variation comprises:
      identifying the collocation candidate as containing a collocation error if the additional association measure is better than the first association measure by more than an error threshold regardless of whether the first association measure satisfies the predetermined condition.

18. The computer-implemented method of claim 17, further comprising identifying, using the processing system, a variation having a corresponding highest additional association measure as a suggested replacement if the highest additional association measure satisfies the predetermined condition and is better than the first association measure.

19. The computer-implemented method of claim 17, further comprising generating, using the processing system, an annotated text based on the input text;
   the generated annotated text highlighting collocation candidates identified as containing a collocation error and inserting identified suggested replacements into the annotated text.

20. The computer-implemented method of claim 13, further comprising correcting, using the processing system, spelling errors in words in the text prior to identifying whether a collocation candidate contains a collocation error.

21. The computer-implemented method of claim 13, wherein identifying a first association measure using the reference database comprises:
   identifying a plurality of contexts for a word within a collocation candidate;
   identifying a count of usages of an identified context within the text corpus as a global frequency;
   identifying a count of usages of the identified context where the word within the candidate phrase is included in the identified context as a local frequency;
   identifying a first rank based on the local frequency;
   identifying a second rank based on the global frequency;
   determining an association measure based on the quotient of the second rank and the first rank.

22. The computer-implemented method of claim 13, wherein the syntactic patterns include a syntactic pattern selected from the group consisting of: verb plus noun phrase, verb plus prepositional phrase, verb plus direct object, adjective plus noun, noun plus noun, subject plus verb, noun of noun, adverb plus adjective, and verb plus adverb.

23. A non-transitory computer readable medium encoded with instructions for detecting collocation errors in an input text using a reference data from a corpus of texts, the instructions for commanding a data processor to:
   identify collocation candidates within the text sample based upon syntactic patterns in the text sample;
   detect whether a given collocation candidate contains a collocation error, the detecting including:
      determining a first association measure using the reference database for the given collocation candidate;
      determining whether the first association measure satisfies a predetermined condition and identifying the given collocation candidate as proper if the first association measure satisfies the predetermined condition;
      determining an additional association measure for a variation of the given collocation candidate using the reference database;
      determining whether or not the collocation candidate contains an error based upon the additional association measure of the variation; and
   store an indicator of whether a collocation candidate contains a collocation error in a computer-readable memory.

24. The non-transitory computer readable medium of claim 23, wherein the instructions command the data processor to:
   generate a variation of the identified collocation candidates;
   wherein the additional association measure corresponds with the generated variation;
   wherein determining whether or not the collocation candidate contains an error based upon the additional association measure of the variation comprises:
      determining whether the additional association measure satisfies the predetermined condition, and
      if the additional association measure satisfies the first predetermined condition, identifying the given collocation candidate as proper; and
      identifying the given collocation candidate as containing a collocation error if the first association measure and the additional association measure fail to satisfy the predetermined condition.

25. The non-transitory computer readable medium of claim 24, wherein the instructions command the data processor to: generate article variations and inflection variations.

26. The non-transitory computer readable medium of claim 24, wherein the instructions command the data processor to:
   identify a collocation candidate as a grammar error if one of the additional association measures is better than the first association measure.

27. The non-transitory computer readable medium of claim 23, wherein the instructions command the data processor to:
   generate a variation of a collocation candidate containing a synonym of a word contained in the collocation candidate;
   wherein the additional association measure corresponds with the generated variation;
   wherein determining whether or not the collocation candidate contains an error based upon the additional association measure of the variation comprises:
      identifying the collocation candidate as containing a collocation error if the additional association measure is better than the first association measure by more than an error threshold regardless of whether the first association measure satisfies the predetermined condition.

28. The non-transitory computer readable medium of claim 27, wherein the error threshold is 25%.

29. The non-transitory computer readable medium of claim 27, wherein the instructions command the data processor to:
   identify a variation having a corresponding highest additional association measure as a suggested replacement if the highest additional association measure satisfies the predetermined condition and is better than the first association measure.

30. The non-transitory computer readable medium of claim 27, wherein the instructions command the data processor to:
   generate an annotated text based on the input text;
   the generated annotated text highlighting collocation candidates identified as containing a collocation error and inserting identified suggested replacements into the annotated text.

31. The non-transitory computer readable medium of claim 23, wherein the instructions command the data processor to:
   output a metric based on a number of collocation errors found in the text sample as part of a basis for a test score.

32. The non-transitory computer readable medium of claim 23, wherein the instructions command the data processor to: correct spelling errors in words in the text sample.

33. The non-transitory computer readable medium of claim 23, wherein the association measure is a rank ratio, and wherein the instructions command the data processor to calculate the association measure by:
   identifying a plurality of contexts for a word within a collocation candidate;
   identifying a count of usages of an identified context within the text corpus as a global frequency;
   identifying a count of usages of the identified context where the word within the candidate phrase is included in the identified context as a local frequency;
   identifying a first rank based on the local frequency;
   identifying a second rank based on the global frequency; and
   determining the association measure based on the quotient of the second rank and the first rank.

34. The non-transitory computer readable medium of claim 23, wherein the syntactic patterns include a syntactic pattern selected from the group consisting of: verb plus noun phrase, verb plus prepositional phrase, verb plus direct object, adjective plus noun, noun plus noun, subject plus verb, noun of noun, adverb plus adjective, and verb plus adverb.

* * * * *